(12) United States Patent
Urabe et al.

(10) Patent No.: US 10,129,886 B2
(45) Date of Patent: *Nov. 13, 2018

(54) CONTROL METHOD OF FREQUENCY BAND SWITCHING AND WIRELESS COMMUNICATION APPARATUS

(71) Applicant: Panasonic Corporation, Osaka (JP)

(72) Inventors: Yoshio Urabe, Kanagawa (JP); Junichi Morita, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,815

(22) Filed: Jul. 11, 2017

(65) Prior Publication Data

US 2017/0311328 A1   Oct. 26, 2017

Related U.S. Application Data

(63) Continuation of application No. 15/341,719, filed on Nov. 2, 2016, now Pat. No. 9,743,411, which is a
(Continued)

(30) Foreign Application Priority Data

Dec. 27, 2012   (JP) ................................. 2012-285861

(51) Int. Cl.
*H04W 72/04* (2009.01)
*H04L 29/06* (2006.01)
(Continued)

(52) U.S. Cl.
CPC ......... *H04W 72/0453* (2013.01); *H04L 29/06* (2013.01); *H04L 69/28* (2013.01);
(Continued)

(58) Field of Classification Search
CPC . H04W 72/0453; H04W 76/04; H04W 36/14; H04W 36/0083; H04W 40/005; H04W 76/20

See application file for complete search history.

(56) References Cited

U.S. PATENT DOCUMENTS 8,908,862 B2 * 12/2014 Chu ....................... H04K 1/003
                                                                                380/44
2011/0053521 A1   3/2011 Cordeiro
(Continued)

FOREIGN PATENT DOCUMENTS

JP   2002-335201 A   11/2002
JP   2007-243882 A    9/2007
(Continued)

OTHER PUBLICATIONS

IEEE P802.11ad/D9.0, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," IEEE, Jul. 2012, pp. 475-486.
(Continued)

*Primary Examiner* — Feben Haile
(74) *Attorney, Agent, or Firm* — Seed IP Law Group LLP

(57) ABSTRACT

In a frequency band switching by Fast Session Transfer (FST), a timeout value (link loss timeout: LLT) is determined based on a change in a communication state, a switching setup sequence including a step of transmitting the determined timeout value to a peer wireless station is performed, and frequency switching to the second frequency band is performed when time of the timeout value elapses from when the switching setup sequence is completed. For example, a large timeout value (LLT=T1) is set at time of
(Continued)

connection establishment, and the LLT is changed (LLT=T2 to T4) based on, for example, a state of transmission data or a change in a channel state.

4 Claims, 10 Drawing Sheets

Related U.S. Application Data continuation of application No. 14/378,909, filed as application No. PCT/JP2013/007412 on Dec. 17, 2013, now Pat. No. 9,516,646.

(51) Int. Cl.
*H04W 36/14* (2009.01)
*H04W 36/00* (2009.01)
*H04W 40/00* (2009.01)
*H04W 76/20* (2018.01)

(52) U.S. Cl.
CPC ....... *H04W 36/0083* (2013.01); *H04W 36/14* (2013.01); *H04W 40/005* (2013.01); *H04W 76/20* (2018.02)

(56) References Cited

U.S. PATENT DOCUMENTS

| 2011/0070842 A1* | 3/2011 | Kwon | H04W 36/30 455/67.13 |
|---|---|---|---|
| 2011/0158110 A1 | 6/2011 | Stacey et al. | |
| 2011/0261755 A1 | 10/2011 | Cordeiro et al. | |
| 2012/0099448 A1 | 4/2012 | Matsuo et al. | |
| 2013/0155847 A1* | 6/2013 | Li | H04W 24/04 370/225 |
| 2013/0266136 A1 | 10/2013 | Chu et al. | |

FOREIGN PATENT DOCUMENTS

| JP | 2012-10316 A | 1/2012 |
|---|---|---|
| JP | 2012-90226 A | 5/2012 |
| WO | 2011/028340 A2 | 3/2011 |
| WO | 2011/078950 A2 | 6/2011 |

OTHER PUBLICATIONS

International Search Report dated Feb. 4, 2014, for corresponding International Application No. PCT/JP2013/007412, 2 pages.

* cited by examiner

CONTROL METHOD OF FREQUENCY BAND SWITCHING AND WIRELESS COMMUNICATION APPARATUS

BACKGROUND

Technical Field

The present disclosure relates to a control method of switching frequency band for a switching frequency band used in wireless communication and a wireless communication apparatus using the method.

Description of the Related Art

In recent years, millimeter wave wireless communication using a 60 GHz band has attracted attention. A study directed to development of the IEEE 802.11 ad, which is an advanced standard for using the 60 GHz band, has been executed also at The Institute of Electrical and Electronics Engineers, Inc. (IEEE) 802.11, which is a wireless Local Area Network (LAN) standard, (see NPL 1).

The 60 GHz band has characteristics that ultra-high-speed transmission is possible but a communication service area is narrower compared to a 2.4 GHz band or a 5 GHz band of a microwave which is widely used in a wireless LAN in the related art. Therefore, a communication method is useful which performs ultrafast communication using the 60 GHz band in a communication service area of the 60 GHz band and performs communication using the 2.4 GHz band or the 5 GHz band in communication service areas other than that of the 60 GHz band, by using multi-band devices available for multiple frequency bands. PTL 1 discloses a method of Fast Session Transfer (FST) by which a multi-band device exchanges information, for example, a switching timing and a switching target frequency band, with a peer station, which is a wireless station of a communication partner, so as to perform a switching procedure, when the multi-band device uses frequency bands while being switched.

PRIOR ART DOCUMENTS

Patent Documents

Patent document 1: U.S. Patent Application Publication No. 2011/0261755 specification

Non-patent Documents

Non-patent document 1: IEEE P802.11 ad/D9.0, [online], issued on Oct. 26, 2012, P. 475-486, [searched for on December 26, Heisei 24 (2012)], the Internet
<URL:http://ieeexplore.ieee.org/xpl/
articleDetails.jsp?tp=&arnumber=6242355&conten
tType=Standards&sortType%3Dasc_p_Sequence%26
filter%3DAND%28p_Publication_Number%3A6242
353%29>

BRIEF SUMMARY

Problems to Be Solved by the Invention

In Fast Session Transfer, there is a problem, for example, of having a possibility of a failure in switching of a frequency band, if a channel state deteriorates before a switching setup sequence is completed.

An object of the present disclosure is to provide a control method of switching frequency band and a wireless communication apparatus, which performs switching of a frequency band to be used.

Means for Solving the Problems

A control method of switching frequency band according to the present disclosure is a method which switches a frequency band used in communication, in a wireless station corresponding to communication in two or more frequency bands. The method includes steps which sets a timeout value based on a change in a communication state, performs a switching setup sequence including a step of transmitting the timeout value used in switching to the communication in a second frequency band among the two or more frequency bands, during communication in a first frequency band among the two or more frequency bands, to a peer wireless station, using the first frequency band which is being used for communication, and performs switching to the second frequency band when time of the timeout value elapses from when the switching setup sequence is completed.

A wireless communication apparatus according to the present disclosure includes a wireless communication unit capable of communicating in two or more frequency bands; a timeout value setting unit capable of setting a timeout value used in switching a frequency band used in communication, based on a change in a communication state; and a switching control unit capable of performing a switching setup sequence including a step of transmitting the timeout value used in switching to the communication in a second frequency band among the two or more frequency bands, during communication in a first frequency band among the two or more frequency bands, to a peer wireless station, using the first frequency band which is being used for communication, and of performing switching to the second frequency band when time of the timeout value elapses from when the switching setup sequence is completed.

Advantages of the Invention

According to the present disclosure, it is possible to provide a control method of switching frequency band and a wireless communication apparatus, which perform switching of a frequency band to be used.

DETAILED DESCRIPTION

Background of Content of Respective Embodiments of Present Disclosure

First, prior to describing embodiments of a control method of switching frequency band and a wireless communication apparatus according to the present disclosure, problems in Fast Session Transfer will be described in more detail.

Figure 10:
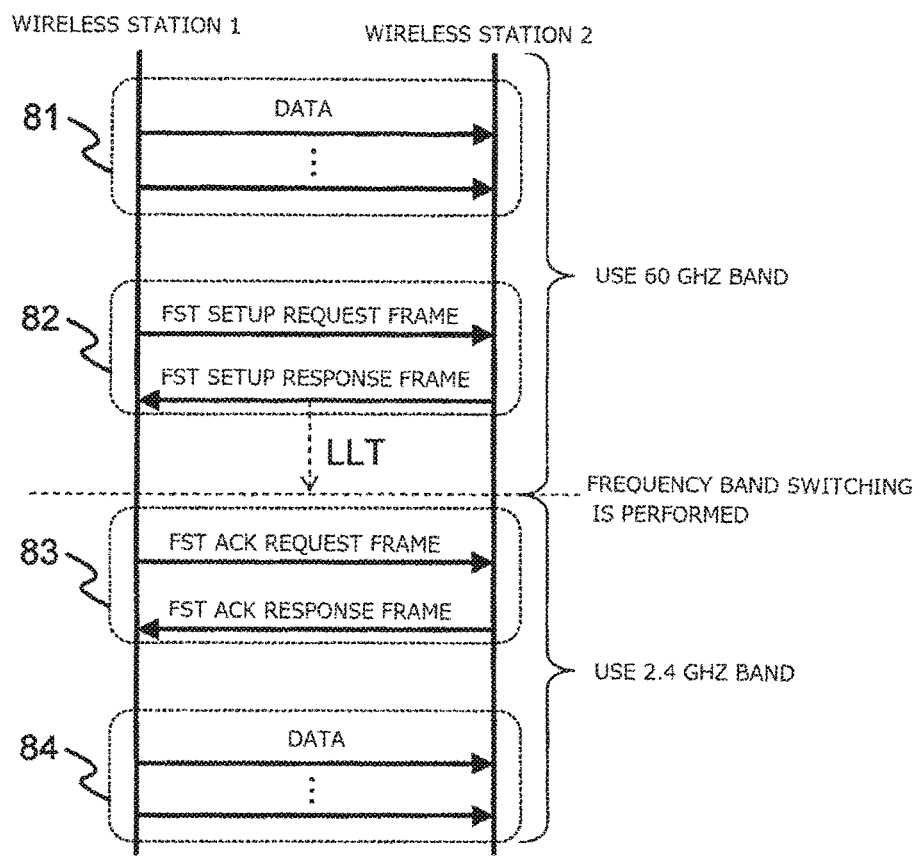
FIG. 10 is a sequence diagram provided for an explanation regarding Fast Session Transfer.

FIG. 10 is a diagram illustrating a basic sequence of a setup and switching procedure of Fast Session Transfer (FST). FIG. 10 describes, as an example, a case in which a wireless station 1 and a wireless station 2, which are wireless communication apparatuses, communicate with each other and perform switching of an operating frequency band to a 2.4 GHz band from a state of performing data transmission using a 60 GHz band.

A switching setup sequence 82 is performed in a state of performing data transmission 81 using the 60 GHz band between the wireless station 1 and the wireless station 2. Then, after the frequency band switching is performed, a switching acknowledgement sequence 83 is performed, and thus the state transitions to a state of performing data transmission 84 using the 2.4 GHz band. Although FIG. 10 illustrates data transmission from the wireless station 1 to the wireless station 2 with respect to the data transmission 81 and 84, reverse direction transmission or bi-direction transmission may be possible.

When it is determined to switch the frequency band from the 60 GHz band to the 2.4 GHz band, the wireless station 1 performs the switching setup sequence 82. A method of determining switching of a frequency band and a timing at which a switching setup is initiated are not described in PTL 1.

In the switching setup sequence 82, the wireless station 1 transmits an FST setup request frame to the wireless station 2, using the 60 GHz band which is a frequency band used before switching. Then, in response to the FST setup request frame, the wireless station 2 transmits the FST setup response frame to the wireless station 1. The FST setup request frame includes a value of link loss timeout (LLT) (hereinafter, referred to as LLT) for controlling a timing at which the switching is performed.

After the switching setup sequence 82 is completed, when a period corresponding to the LLT elapses without performing data transmission, the wireless station 1 and the wireless station 2 perform switching of the frequency band to be used to the 2.4 GHz band. After the switching of the frequency band is performed, the switching acknowledgement sequence 83 is performed.

In the switching acknowledgement sequence 83, the wireless station 1 transmits an FST ACK Request frame to the wireless station 2 using the 2.4 GHz band which is the frequency band after the switching. In response to the FST ACK Request frame, the wireless station 2 transmits a FST ACK Response frame to the wireless station 1. Then, data transmission 84 using the 2.4 GHz band is performed.

In a case of counting the LLT with a lapse of time after the completion of the switching setup sequence 82, if respective wireless communication apparatuses are successful in transmission of a frame, for example, a data frame having an individual address to/from a peer station, the count of the time of the LLT is reset.

In the Fast Session Transfer described above, if the channel state deteriorates before the switching setup sequence 82 is completed, there is a problem in that the frame of the switching setup sequence 82 has difficulty to reach the peer station and thus the switching of the frequency band fails.

Further, when the frequency band of the switching target is not used, it is preferable that a circuit relating to the frequency band of the switching target in the wireless communication apparatus be in a sleep state so as to reduce power consumption. However, for causing the circuit to resume from the sleep state when the switching setup sequence 82 is performed, if time required to resume is longer than LLT, the switching acknowledgement sequence 83 is difficult to be performed, and thus there is a problem of a failure in switching. To solve the problem, it is possible to set LLT to longer than a time required to resume from the sleep state, so that the switching acknowledgement sequence 83 can be performed. In that case, however, it takes long time until the switching of the frequency band is performed, and thus fast transfer becomes difficult.

In view of the problem in the Fast Session Transfer described above, the present disclosure provides a control method of switching frequency band capable of realizing the switching of a frequency band even when a channel state deteriorates.

Further, the present disclosure provides a control method of switching frequency band capable of realizing a fast switching and capable of changing of a circuit regarding a switching target frequency band to a sleep mode most of time the switching target frequency band is not used.

Embodiments of the Present Disclosure

Hereinafter, embodiments of the present disclosure will be described in detail with reference to the drawings. In the embodiments, the same components are denoted by the same reference numerals, and thus, the repeated description thereof will be omitted.

First Embodiment

Figure 1:
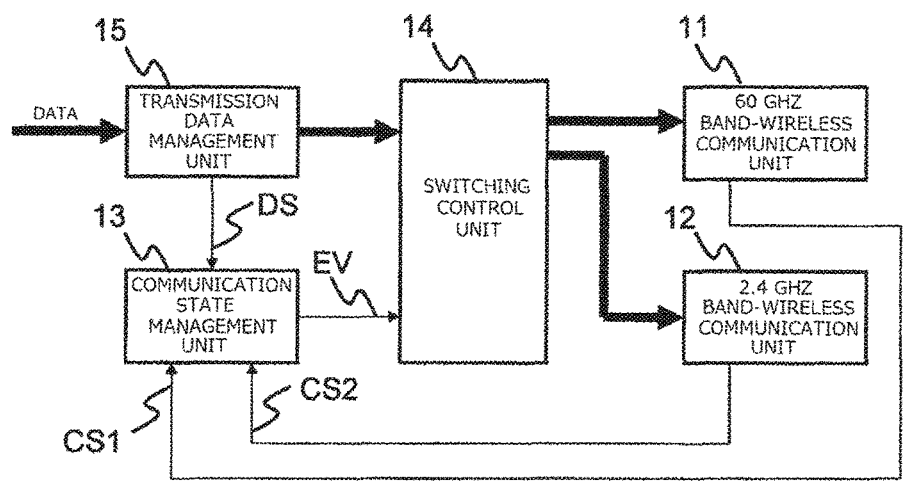
FIG. 1 is a diagram illustrating a configuration example of a wireless communication apparatus using a control method of switching frequency band according to a first embodiment of the present disclosure.

FIG. 1 is a diagram illustrating a configuration example of a wireless communication apparatus using a control method of switching frequency band of the present disclosure. In FIG. 1, thick lines represent flows of data. Each block is a functional block for describing a concept of a function, and is made of hardware, for example, an integrated circuit, or is realized by executing predetermined hardware in a configuration having a processor and a memory. It is not necessarily limited to the configuration as illustrated, but may have another configuration realizing the same function.

The wireless communication apparatus includes a 60 GHz band-wireless communication unit 11 and a 2.4 GHz band-wireless communication unit 12, and wireless communication is possible on each frequency band by switching respective frequency bands. Respective wireless communication units 11 and 12 may separately be in sleep modes for consuming little power.

Further, the wireless communication apparatus includes a communication state management unit 13, a switching control unit 14, and a transmission data management unit 15. The communication state management unit 13 determines a communication state with reference to channel state information CS1 which is output from the 60 GHz band-wireless communication unit 11, channel state information CS2 which is output from the 2.4 GHz band-wireless communication unit 12, and transmission data state information DS which is output from the transmission data management unit 15. When it is determined that there is a change in the communication state, the communication state management unit 13 generates event information EV indicating a change in the communication state and outputs the generated event information to the switching control unit 14. Hereinafter, the change in the communication state is denoted by "event".

The switching control unit 14 determines a link loss timeout value LLT which is a parameter of a frequency band switching setting, based on the event information EV. Further, the switching control unit 14 manages the frequency band switching setting state and performs the switching setup sequence, and assigns transmission data to either the 60 GHz band-wireless communication unit 11 or the 2.4 GHz band-wireless communication unit 12, based on the switching state. Further, the switching control unit 14 includes a dummy frame transmission control function which will be described later.

The transmission data management unit 15 temporarily stores input data in a transmission queue included in the transmission data management unit 15, outputs the input data as transmission data from the transmission queue, and sends the transmission data to the wireless communication units 11 or 12 of respective frequency bands through the switching control unit 14.

Figure 2:
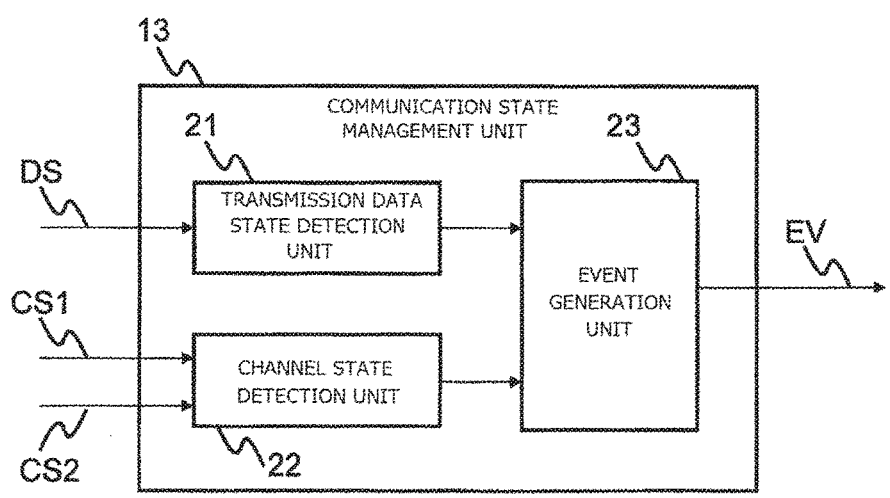
FIG. 2 is a diagram illustrating a configuration of a communication state management unit of the wireless communication apparatus of FIG. 1.

FIG. 2 is a diagram illustrating a detailed configuration of the communication state management unit 13 of FIG. 1. The communication state management unit 13 is configured to include a transmission data state detection unit 21, a channel state detection unit 22, and an event generation unit 23.

The transmission data state detection unit 21 detects a state of transmission data in the transmission data management unit 15 based on the transmission data state information DS to perform determination of a state change. The transmission data state detection unit 21 instructs the event generation unit 23 to generate an event, when the state change is detected according to the transmission data state detection. The transmission data state detection includes, for example, the detection of connection establishment with the peer wireless station, an initiation and termination of a stream of transmission data, or the amount of data accumulated in the transmission queue.

The channel state detection unit 22 detects a channel state to perform determination of a state change of a channel, based on the channel state information CS1 which is output from the 60 GHz band-wireless communication unit 11 and the channel state information CS2 which is output from the 2.4 GHz band-wireless communication unit 12. The channel state detection unit 22 instructs the event generation unit 23 to generate an event when a state change in the channel occurs. The channel state information CS1 and CS2 includes, for example, error information indicating a state of a transmission error or received signal strength.

The event generation unit 23 generates the event information EV based on the event generation instructions which are output from the transmission data state detection unit 21 and the channel state detection unit 22, and notifies the switching control unit 14 of the event information EV.

Figure 3:
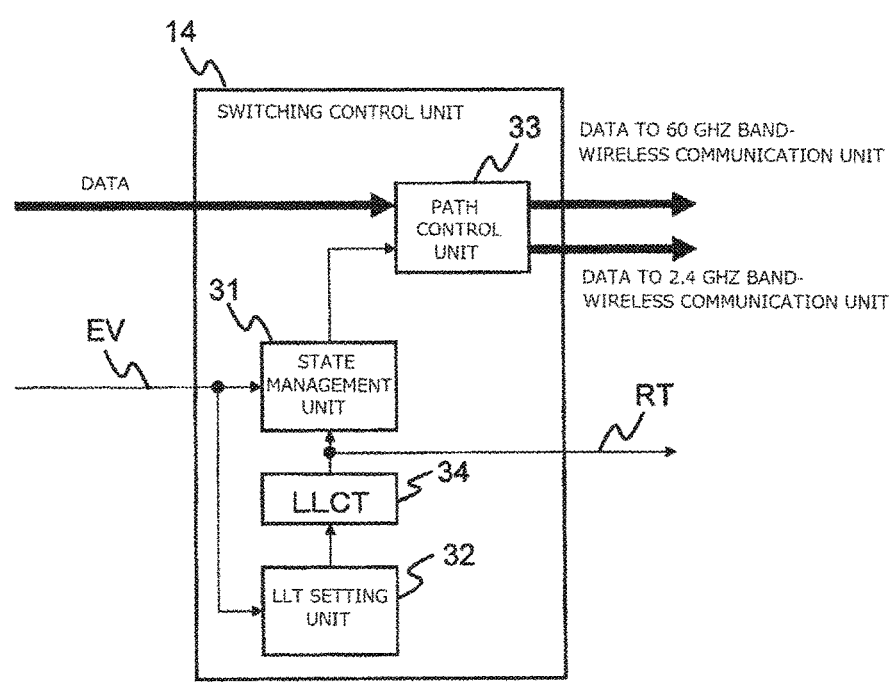
FIG. 3 is a diagram illustrating a configuration of a switching control unit of the wireless communication apparatus of FIG. 1.

FIG. 3 is a diagram illustrating a detailed configuration of the switching control unit 14 of FIG. 1. A procedure of frequency band switching which is mainly performed by the switching control unit 14 and the switching setup sequence is basically compliant with the Fast Session Transfer (FST) described in PTL 1 and illustrated in FIG. 10.

Specifically, the method of frequency band switching is a method in which the switching setup sequence which starts from the transmission of the FST setup request frame including LLT is performed so as to complete switching setup, both the wireless stations perform the frequency band switching when time of the LLT elapses thereafter, and the switching acknowledgement sequence is performed in the frequency band after the switching so as to complete the frequency band switching. The method of frequency band switching is not limited to the above method and other methods may be used.

The switching control unit 14 includes a state management unit 31, an LLT setting unit 32, a Link Loss Countdown Timer (LLCT) (hereinafter, denoted by a timer) 34, and a path control unit 33.

The state management unit 31 performs a state management regarding a frequency band switching setting of Fast Session Transfer and a switching setup sequence execution, based on the event information EV which is input. In addition, the state management unit 31 also performs dummy frame transmission control based on the remaining time of the timer.

The LLT setting unit 32 selects a value of a proper LLT depending on a type of an event, based on the event information EV, and sets the value as an initial value of the timer (LLCT) 34. The LLT setting unit 32 realizes a function of the timeout value setting unit. Further, the state management unit 31 uses the LLT which is set in LLT setting unit 32 as the LLT value included in the FST setup request frame.

The path control unit 33 assigns transmission data, frames of the switching setup sequence and the switching acknowledgement sequence, and dummy frames to the wireless communication units 11 and 12 of respective frequency bands in response to the state information which is output from the state management unit 31.

The timer 34 counts down from an initial value (LLT value) to 0 while the transmission of the frame having the individual address to/from the peer station is not performed. When the transmission of the frame having the individual address to/from the peer station is performed, the setting of an LLT value of the timer 34 is reset by the LLT setting unit 32, and the timer 34 is reset.

When the counter value of the timer 34 becomes 0, in other words, when the link loss timeout time (LLT) elapses, the state management unit 31 and the path control unit 33 of the switching control unit 14 perform a frequency band switching. The remaining time RT, which is an amount indicating a remaining time obtained as a result of the countdown from an initial value based on the LLT value, is output from the timer 34.

Typically, a current counter value of the timer 34 is output as the remaining time RT. The remaining time RT is used for dummy frame transmission control in the state management unit 31. In addition, in a case of including sleep control which will be described later, since the remaining time RT is used for the sleep control, it is configured to output the remaining time RT to the outside.

Figure 4:
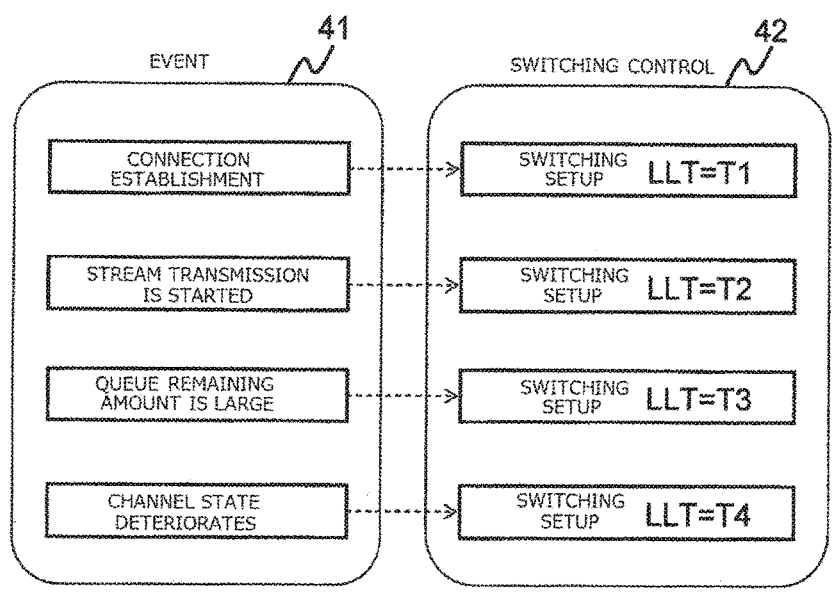
FIG. 4 is a diagram illustrating an execution example of a switching setting according to an event.

FIG. 4 is a diagram illustrating a correspondence of an event example to an execution example of a switching setting in response to each event. In FIG. 4, an event 41 shown in the left portion illustrates an example of a type of event information EV that the communication state management unit 13 of FIG. 2 generates, and switching control 42 shown in the right portion illustrates an example of a value of LLT in the switching setting that the switching control unit 14 of FIG. 3 performs. The value of LLT is set in LLT setting unit 32 of the switching control unit 14.

Hereinafter, an example of each event will be described in detail. Similarly to FIG. 10, the embodiment will be described regarding a case of performing a switching setup and a switching execution of the frequency band to the 2.4 GHz band from a state in which connection is established and communication is performed in the 60 GHz band between the wireless station 1 and the wireless station 2. In the following description, the switching setup means performing the switching setup sequence 82 in FIG. 10.

The transmission data state detection unit 21 determines connection establishment, based on the transmission data state information DS which is output from the transmission data management unit 15. Here, the connection establishment means establishment of a physical link with a peer wireless station, like association completion in a Media Access Control (MAC) function of a wireless LAN or security authentication completion thereafter.

Although data transmission with the peer station is possible after the connection establishment, in many cases, a state of data to be transmitted and a state of a channel are not clear for a certain amount of time after the connection establishment. Further, when frequency band switching setup is not performed over a long period of time after the connection establishment, it is difficult to detect the channel state deterioration because current condition of the channel is not recognized. In addition, even if the channel state deterioration can be detected, the frame of the switching setup sequence may not be received by the peer station when attempting the switching setup and thus the switching setup fails.

Therefore, the switching control unit 14 performs the switching setup of the frequency band switching within a predetermined period just after the connection establishment is detected. Consequently, during the operation of the wireless communication unit, a state is avoided in which the frequency band switching setup is not completed over a long period of time, thus the switching becomes possible even when the channel state deteriorates.

The timer 34, which counts down to switch the frequency band, is reset to the value of LLT by the transmission of a frame having an individual address to/from the peer station being performed. When data transmission continues even after the switching setup sequence completion, the frequency band switching is not performed by setting the LLT to a value greater than a data frame transmission interval, because the timer 34 is reset to a value of LLT by transmission of data frames before the time is counted down and reaches 0. When the transmission of data frames is interrupted, the countdown is continued and the frequency band switching is performed when the timer reaches 0.

A certain amount of specific data to be transmitted may not be input during some period after the connection is established, therefore the value of LLT is set to TI which is a relatively large time and the switching setup sequence is performed at connection establishment.

When there is no data to be transmitted, a state in which a frame is not transmitted to/from the peer station over the time of LLT is likely to occur. If the LLT is set to be small, the time of the LLT elapses without transmitting a frame, and the frequency band switching occurs. In this case, the frequency band is switched to the 2.4 GHz band even though the ultra-high-speed communication is possible on the 60 GHz band which is a frequency band before the switching, therefore a data transmission speed is greatly reduced.

Therefore, in the present embodiment, in order to prevent the frequency band switching which disregards the communication in 60 GHz band as described above, the switching control unit 14 sets a relatively large time T1 as LLT at the connection establishment. Although it is preferable to set T1 to a value of, for example, one second to several seconds or so, the T1 may be set to a greater value which is a minute or more.

In addition, as LLT becomes greater, there is an advantage in that it is possible to increase a sleep time in sleep control, which will be described later, and to reduce an overhead when a dummy frame is transmitted, which will be described later. On the other hand, when the channel state of the 60 GHz band deteriorates, average time until the switching to the 2.4 GHz band is executed tends to increase. With respect to this tendency, it is possible to reduce the average time until the switching is executed by detecting a communication state in which fast switching is required and by changing LLT into a value smaller than the T1, based on another event which will be described later.

The transmission data state detection unit 21 also determines whether or not the stream transmission is started based on the transmission data state information DS which is output from the transmission data management unit 15. The stream transmission above means transmission of, for example, a whole content of video, data of a file transmitted at a time in the file transfer, or other kinds of unitary chunk of data. When stream transmission start is detected, the switching control unit 14 executes the switching setup after changing the value of LLT to T2.

When the switching setup by another value of LLT is already completed and the timer 34 is still counting down, for example, when the stream transmission start is detected in a state in which the switching setup is completed in a case where LLT=T1 by the connection establishment described above, the switching control unit 14 changes the value of LLT to T2 so as to reconfigure the switching setup. Hereinafter, reconfiguring the switching setup with the changed LLT is referred to as switching re-setup. The switching setup of FIG. 4 includes switching re-setup.

According to FST standard in NPL 1, which is a draft standard of Fast Session Transfer, a procedure of changing the value of LLT is not defined in a switching setup completion state. Therefore, the switching re-setup is defined as follows with newly defined frames, an LLT change request frame and an LLT change acknowledgment frame. The LLT change request frame is transmitted from the wireless station 1 to the wireless station 2 first, then the LLT change acknowledgment frame is transmitted from the wireless station 2 to the wireless station 1 in response.

Alternatively, the same function may be realized by executing the switching setup sequence using another value of LLT after an FST Tear Down frame which is defined in the FST standard is transmitted.

Once the stream transmission is started, the data frame is expected to be transmitted regularly, and thus it is appropriate to define the LLT value T2 to be a value which is greater than the expected interval of the data frame transmission. The T2 needs not be a fixed value, but may be selected from multiple different values depending on a parameter, for example, a type of a stream or an information rate, or may be set to a value calculated based on a parameter.

As a result of setting the value of LLT suitable for stream transmission, even if the channel state deteriorates, the switching of a frequency band is performed during a shorter period of time compared to a case where LLT is set to T1, thus great delay or loss in the data frame can be prevented. On the other hand, when the channel state does not deteriorate, the timer 34 is reset to the value of LLT which is an initial value by the transmission of the data frame. For this reason, it is possible to prevent the possibility of switching from being executed even if the channel state of the 60 GHz band is good. Therefore, the probability of the dummy frame being required is small even when using a dummy frame which will be described later, and thus it is possible to suppress an increase in the overhead due to the dummy frame.

With respect to the state of the stream transmission, it is also possible to change LLT and execute the switching re-setup when the end is detected, not only when the start is detected. For example, in case that the switching setup has been completed with the LLT value of T1 at the connection establishment, the value of LLT is changed to T2 and the switching re-setup is completed when the stream transmission start is detected, thereafter, if the stream transmission end is detected, it is preferable to set LLT to T1 and perform the switching re-setup again in order to return to the state before the previous switching re-setup.

Further, the transmission data state detection unit 21 also determines a queue remaining amount, which is a remaining amount of data in the queue, based on the transmission data state information DS which is output from the transmission data management unit 15. The transmission data management unit 15 temporarily stores data, which is input, in a transmission queue, and deletes data which is transmitted successfully as transmission data, from the transmission queue. Thus, when data is input faster than a transmission rate, or a large capacity of data is input at a time, the remaining amount of data accumulated in the transmission queue becomes large. It is assumed that the status having a large queue remaining amount occurs in a case of, for example, transmission of a large amount of data without intermitting, such as a file transmission.

If it is detected that the queue remaining amount reaches a predetermined value or higher, the switching control unit 14 sets the value of LLT to T3 and performs the switching setup. In a state in which data remains in the transmission queue, data is transmitted successively at short time intervals, and thus it is appropriate to set the LLT value to T3 which is in the order of several times the frame size. Therefore, T3 becomes a value less than T2, but larger than T2 in some cases.

The reason for setting the T3 is the same as the LLT setting described above (LLT=T2) in the case of the stream transmission start. In other words, the switching can be performed at a high speed even if the channel state deteriorates, while the timer 34 is reset by the transmission of the data frame if the channel state is good, and thus it is possible to suppress the occurrence of switching that disregards the communication in the 60 GHz band. Similar to T2, T3 needs not to be fixed to a value, but may be selected from multiple values depending on the queue remaining amount or may be set to a value calculated based on the queue remaining amount.

With respect to the state of the queue, although it is described that a transmission queue is provided in the transmission data management unit 15 and the state of the transmission queue is referred to, embodiments are not limited thereto. For example, each transmission queue may be provided in each wireless communication unit of each frequency band, and the state of the transmission queue of the 60 GHz band-wireless communication unit 11 which is used before switching may be referred to.

The channel state detection unit 22 determines the channel state deterioration, based on channel state information CS1 which is output from the 60 GHz band-wireless communication unit 11 and channel state information CS2 which is output from the 2.4 GHz band-wireless communication unit 12. When the 60 GHz band is used before switching, the channel state detection unit 22 uses the channel state information CS1 which is output from the 60 GHz band-wireless communication unit 11.

Information regarding a transmission error, such as a transmission error probability or an occurrence of retransmission timeout, or Received Signal Strength Indicator (RSSI) can be used, for example, as the channel state information. In addition, the channel state information is not limited thereto, and other information, for example, information regarding a signal-to-noise ratio or an interference state may be used.

If the channel state detection unit 22 determines that the switching is to be performed because the channel state deteriorates, the switching control unit 14 sets the value of LLT to T4 and performs the switching setup. It is preferable to set the LLT value T4 to a minimum value necessary for enabling the wireless communication unit 12 of the frequency band after the switching to communicate.

The value of LLT may be set to 0 if it is possible for the wireless communication unit 12 of the frequency band after the switching to perform communication within a predetermined time after switching. In case of LLT=T4=0, the wireless communication unit 12 performs the frequency band switching, without countdown by the timer 34. The switching setup may also be performed with the value of LLT set to 0 if it is intended to force the frequency band switching regardless of the channel state.

FIG. 4 is to illustrate an example of the switching setup corresponding to various events, and it is not necessary for the various events described above to occur in the order shown in FIG. 4. The operation regarding the frequency band switching will be described with reference to FIG. 5.

Figure 5:
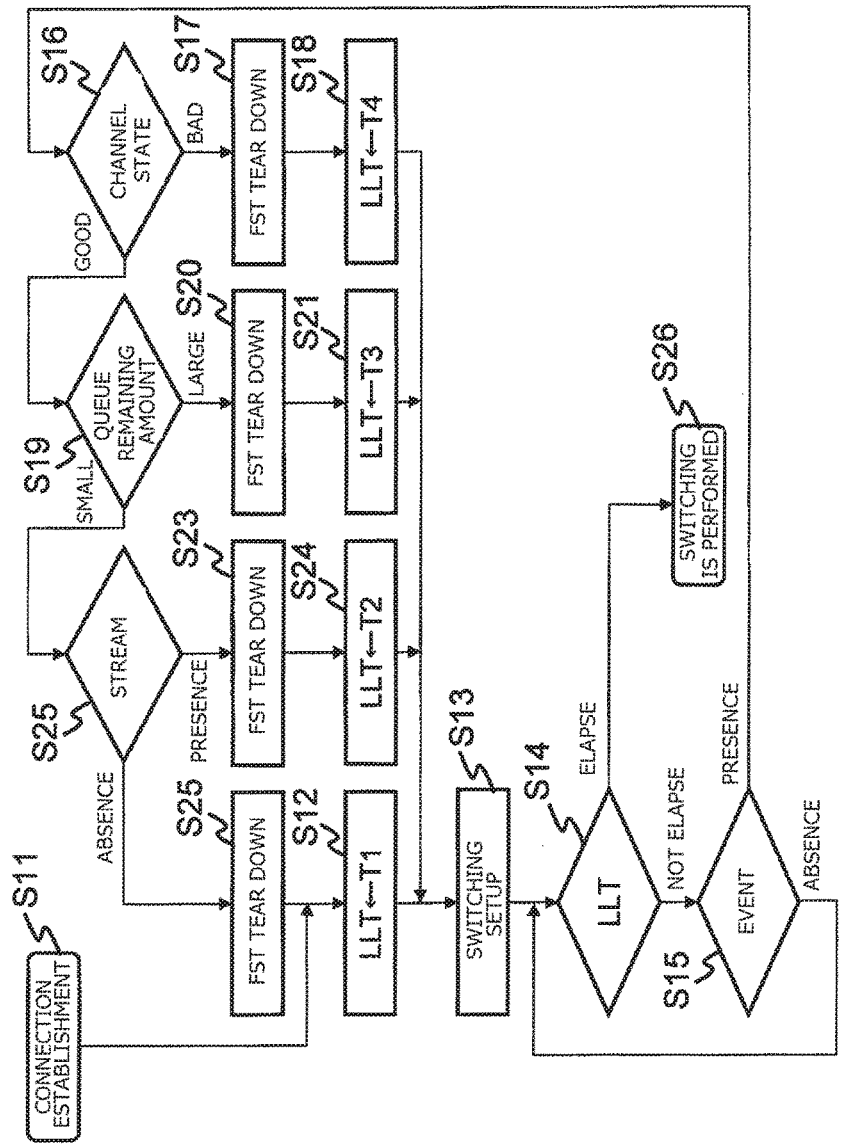
FIG. 5 is a flowchart illustrating an operation 1 of the control method of switching frequency band according to the first embodiment.

FIG. 5 is a flowchart illustrating an operation example 1 of the control method of switching frequency band. In the operation example illustrated in FIG. 5, the switching re-setup procedure is assumed that an FST tear down is performed first, then the LLT is set to a new value and the switching setup sequence is performed.

First, if the connection establishment is detected in the communication state management unit 13 (step S11), the switching control unit 14 sets LLT to T1 (step S12), and performs the switching setup (step S13). Since the above switching setup is executed for a first time and there remains no effect of previous switching setup, the FST tear down process needs not to be performed.

After the switching setup is completed, the switching control unit 14 determines whether or not the time of LLT elapses based on the countdown by the timer 34 (step S14), and waits until time of the LLT elapses. Then, the switching control unit 14 determines the presence or absence of the occurrence of an event while the time of LLT has not expired (step S15).

When an event occurs before time of the LLT elapses, the switching control unit 14 performs the switching re-setup depending on the type of an event, and returns again to a standby state of waiting for the elapse of time of LLT.

When the channel state deterioration is detected as an event (step S16), after an FST tear down process is performed (step S17), the switching control unit 14 sets LLT to T4 (step S18), and performs switching setup (switching re-setup) (step S13). Then, the switching control unit 14 is on standby until time of the LLT elapses (step S14) while detecting the occurrence of an event (step S15).

When a queue remaining amount is detected as an event (step S19), after the FST tear down process is performed (step S20), the switching control unit 14 sets LLT to T3 (step S21), and performs switching setup (switching re-setup) (step S13). Then, the switching control unit 14 is on standby until time of the LLT elapses (step S14) while detecting the occurrence of an event (step S15).

When a stream transmission start is detected as an event (step S22), after the FST tear down process is performed (step S23), the switching control unit 14 sets LLT to T2 (step S24), and performs switching setup (switching re-setup) (step S13). Then, the switching control unit 14 is on standby until time of the LLT elapses (step S14) while detecting the occurrence of an event (step S15).

When the detected event is another event, in order to return to the state of the switching setting at the connection establishment, after the FST tear down process is performed (step S25), the switching control unit 14 sets LLT to T1 (step S12), and performs switching setup (switching re-setup) (step S13). Then, the switching control unit 14 is on standby until time of the LLT elapses (step S14) while detecting the occurrence of an event (step S15).

When the counter value reaches 0 through the countdown by the timer 34 and the time of the LLT elapses in step S14, the switching control unit 14 performs frequency band switching (step S26).

In the present operation example, the standby state of waiting for the elapse of LLT is illustrated as a loop process of repeating a determination of the elapsing of LLT and a determination of the occurrence of an event, but a realizing method thereof is not limited thereto. For example, the standby state may be realized using an interrupt processing by the timer or an interrupt processing by an event.

The types of events and the corresponding LLT values are assumed to be the same as those in FIG. 4. The value of each LLT is defined such that T1>T2>T3>T4. Since it is considered that an event having a small LLT value means a status with a high necessity for a high speed switching and the event has a high priority, in the example in FIG. 5, an event having a small LLT value is prioritized in the order of the branch depending on the type of an event.

Although the operation of the timer 34 is not shown in the figure, the countdown by the timer 34 and the resetting by the transmission of the frame are performed in the background. When LLT is set to T1, T2 or T3, a data frame or a dummy frame is transmitted by an interval shorter than LLT even after the switching setup is completed, such that the timer 34 is reset, and the execution of the frequency band switching is suppressed.

Further, although the sleep control and the control of dummy frame transmission also are not illustrated, it is preferable that they are included in the process after the switching setup. The operations will be described hereinafter.

Figure 6:
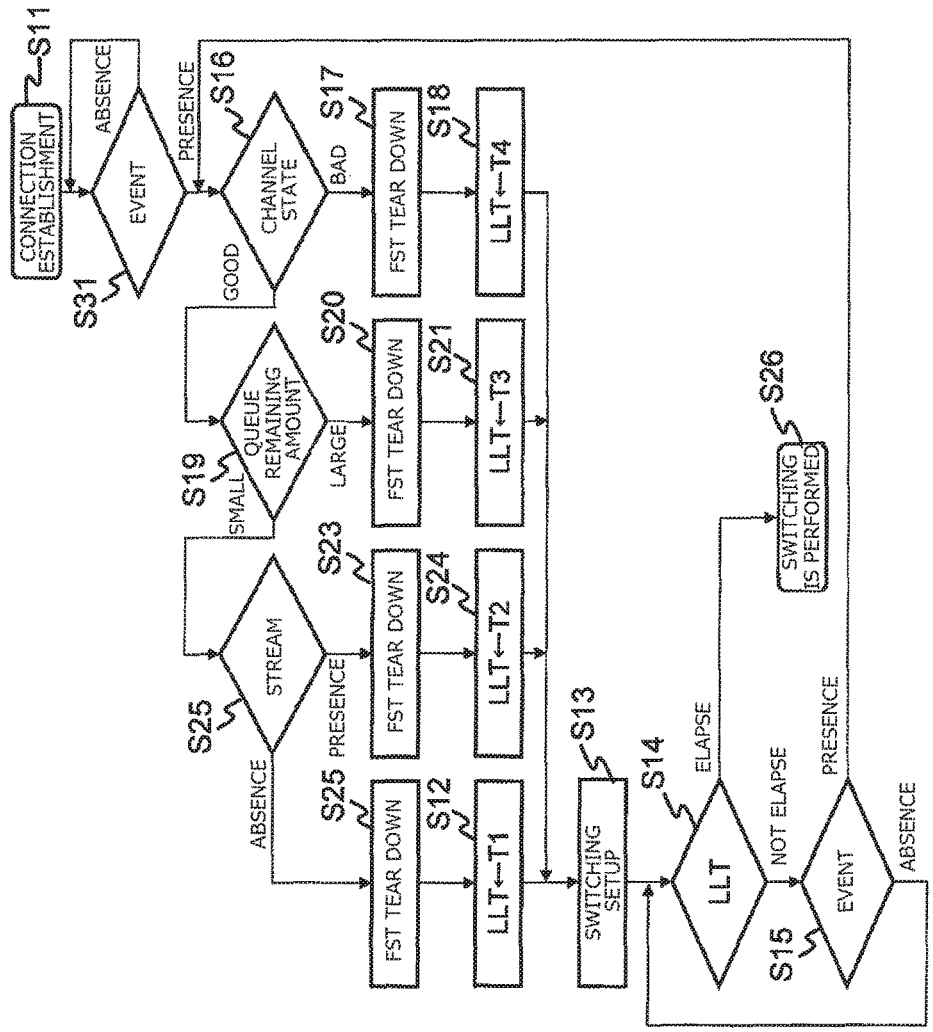
FIG. 6 is a flowchart illustrating an operation 2 of the control method of switching frequency band according to the first embodiment.

FIG. 6 is a flowchart of an overall operation example 2 of the control method of switching frequency band. The operation example 2 is a variation of the operation example 1 descried above, and illustrates an operation when the switching setup at the connection establishment is not performed. A difference from the operation 1 illustrated in FIG. 5 will be described below.

After the connection establishment is detected in the communication state management unit 13 (step S11), the switching control unit 14 determines the presence or absence of the event occurrence (step S31). When any event occurs, the switching control unit 14 performs the switching setup depending on the type of an event, and is in a standby state of LLT elapse.

In an event of channel state deterioration, the switching control unit 14 sets LLT to T4 (steps S16, S17, and S18), and performs switching setup (step S13). In an event in which the queue remaining amount is large, the switching control unit 14 sets LLT to T3 (steps S19, S20, and S21), and performs the switching setup (step S13). In an event of the stream transmission start, the switching control unit 14 sets LLT to T2 (steps S22, S23, and S24), and performs the switching setup (step S13). In other events, the switching control unit 14 sets LLT to T1 (steps S25, and S12), and performs the switching setup (step S13). Thereafter, the switching control unit 14 repeats the determination of LLT elapse (step S14) and the event occurrence (step S15), and when the event occurs, the switching control unit 14 performs the switching re-setup depending on the type of an event and returns again to the standby state of LLT elapse.

As described above, in the present embodiment, in the frequency band switching by the Fast Session Transfer (FST), the switching control unit 14 sets a different value of LLT depending on various events indicating the change in the communication state and performs switching setup with variable LLT. Thus, it is possible to realize the fast frequency band switching when the channel state deteriorates, while suppressing the frequency band switching which disregards the communication in the 60 GHz band.

Further, it is assumed that a change in the communication state includes the connection establishment, the switching setup is performed with a large LLT value at the connection establishment, and thus it is possible to prevent a state in which a frequency band switching setup is not completed over a long period of time. Thus, even when the channel state deteriorates, it is possible to perform the frequency band switching. Further, it is possible to achieve both stability and high speed of the frequency band switching by dynamically changing LLT based on a change in the communication state, for example, the state of the transmission data, and changes in the channel state.

Second Embodiment

Figure 7:
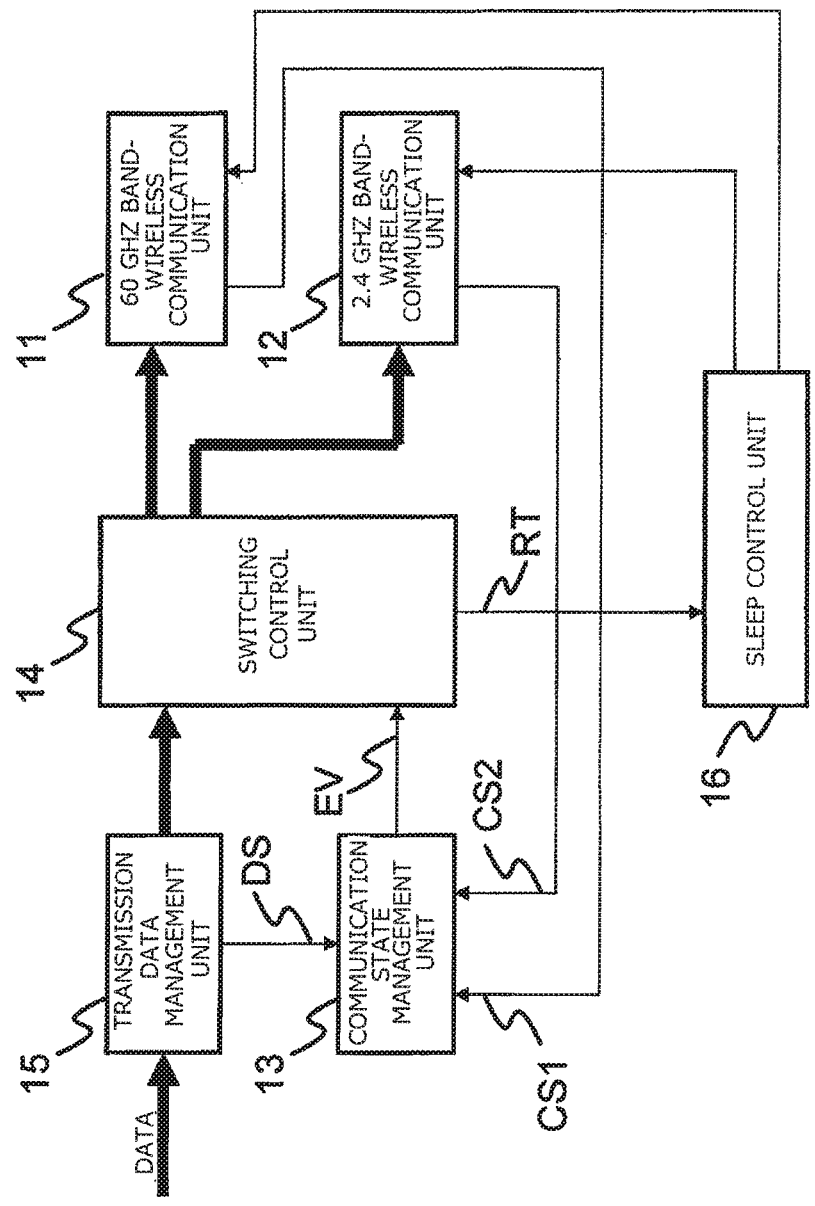
FIG. 7 is a diagram illustrating a configuration example of a wireless communication apparatus using a control method of switching frequency band according to a second embodiment of the present disclosure.

FIG. 7 is a diagram illustrating a configuration example of a wireless communication apparatus having a sleep control function in connection with the frequency switching control of the present disclosure. The second embodiment includes a sleep control unit 16, in addition to the configuration of the first embodiment illustrated in FIG. 1.

The sleep control unit 16 controls each sleep state of respective wireless communication units of the 60 GHz band-wireless communication unit 11 and the 2.4 GHz band-wireless communication unit 12 independently. Although the control of the sleep state is performed in view of many factors other than the frequency switching, sleep control in association with the frequency band switching is described with respect to the sleep control unit 16 in the present embodiment.

The sleep control unit 16 performs the sleep control on the wireless communication unit of the switching target frequency band, based on the countdown remaining time RT obtained from the switching control unit 14. Other components are the same as those in FIG. 1, and thus the description thereof will not be described.

Figure 8:
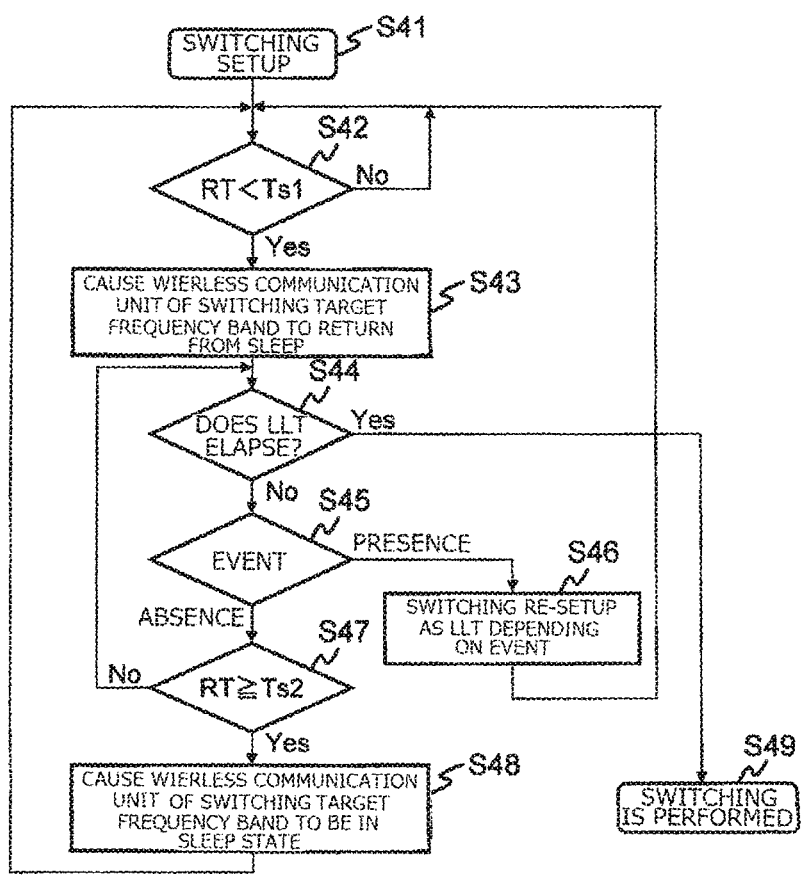
FIG. 8 is a flowchart illustrating sleep control in the control method of switching frequency band according to the second embodiment.

FIG. 8 is a flowchart illustrating sleep control in the control method of switching frequency band of the present embodiment. The switching setup (step S41) corresponding to the start of the flow of FIG. 8 corresponds to the process of the switching setup (step S13) in FIG. 5.

After the switching setup is performed (step S41), the sleep control unit 16 determines whether or not the remaining time RT is less than a predetermined time Ts1 (step S42). The sleep control unit 16 makes the wireless communication unit of the switching target frequency band which is not currently used (in the present example, the 2.4 GHz band-wireless communication unit 12), in both wireless stations communicating with each other, be in a sleep state of consuming low power as much as possible. Then, if the countdown is performed and the remaining time RT is less than Ts1, the sleep control unit 16 causes the wireless communication unit of the switching target frequency band to resume from the sleep state (step S43). Thus, if switching is executed when time of the LLT elapses, the wireless communication unit of the switching target frequency band becomes available because the wireless communication unit of the switching target frequency band resumes from the sleep state before the time of the LLT elapses.

Even if the wireless communication unit resumes from the sleep state once, it is possible that, thereafter, another event is generated and the value of LLT is changed and the re-setup is performed. In other words, the switching control unit 14 performs the determination of whether time of the LLT elapses (step S44) and whether an event is generated (step S45), and performs the switching re-setup by an LLT setting value depending on the type of an event, when an event is generated before time of the LLT elapses (step S46).

When the switching re-setup makes a state of having sufficiently large time up to a lapse of time of the LLT, the sleep control unit 16 causes the wireless communication unit of the switching target frequency band to be again in the sleep state. In other words, the sleep control unit 16 determines whether the remaining time RT is a predetermined time Ts2 or more (step S47), and makes the wireless communication unit of the switching target frequency band in a sleep state (step S48) if the remaining time RT is Ts2 or more.

Ts1 and Ts2 are predetermined times for determination in the sleep control. It is preferable to set the Ts1 to a minimum time sufficient for resuming the wireless communication unit of the switching target frequency band from the sleep state. It is preferable to set the Ts2 to a value which is sufficiently greater than the Ts1 in order to prevent frequent occurrence of the turning ON/OFF of sleep or to prevent from becoming unstable, and it is appropriate to set the Ts2 to a value smaller than the T1 in FIGS. 4 and 5.

If the counter value reaches 0 by countdown by the timer 34 and time of the LLT elapses in step S44, the switching control unit 14 performs the frequency band switching (step S49).

In addition, the wireless station 2 which is a peer station also shares the value of LLT and causes the timer (LLCT) to operate in a similar manner, and thus it is possible to perform the control of the sleep state by the same method. However, since it is considered that the appropriate value of the Ts1 is different depending on the wireless station, it is preferable to set the Ts1 to a value suitable for each wireless station instead of a fixed value which is common between the wireless stations.

Although the sleep control described hitherto, the procedure may be applied to operations other than the sleep control, which enable the wireless communication unit of the switching target frequency band to communicate. Several operations which require a certain amount of time prior to a communication start, for example, an association and authentication for connection establishment in a MAC function, or obtaining IP address, may be controlled to start before the switching is performed depending on the countdown remaining time of the timer.

Figure 9:
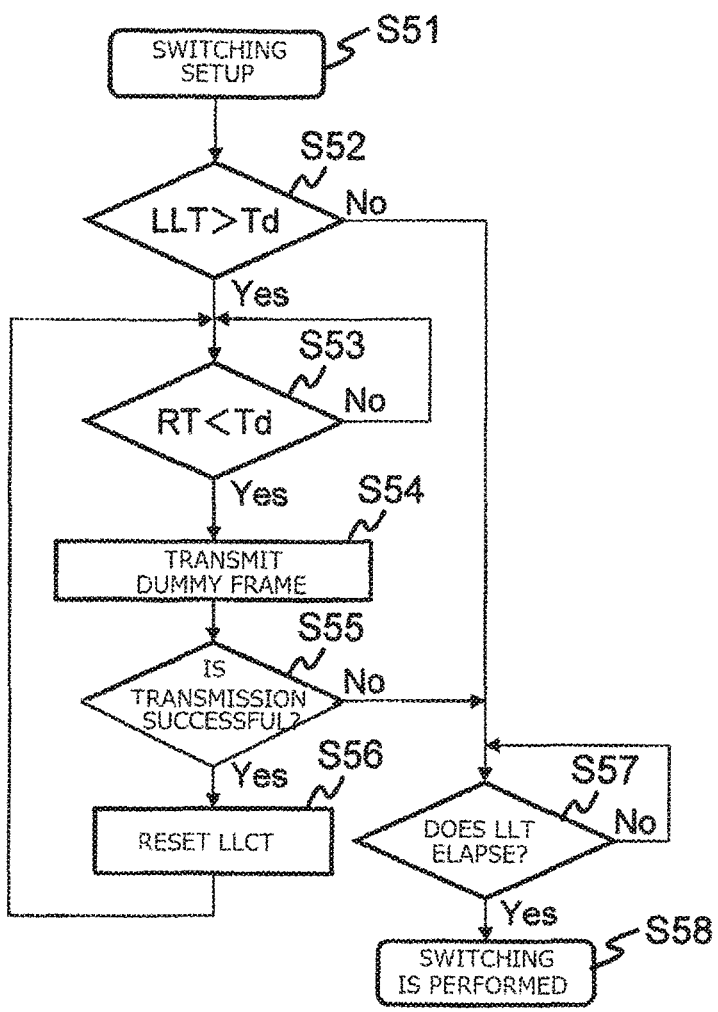
FIG. 9 is a flowchart illustrating control of dummy frame transmission in the control method of switching frequency band according to the second embodiment.

FIG. 9 is a flowchart illustrating dummy frame transmission control in the control method of switching frequency band of the present embodiment. The switching setup (step S51) corresponding to the start of the flow of FIG. 9 corresponds to the process of the switching setup (step S13) of FIG. 5. The dummy frame transmission control is performed by the state management unit 31 of the switching control unit 14.

The dummy frame transmission control suppresses the execution of the frequency band switching which disregards communication in the 60 GHz band when no transmission of data frame is performed for a period of LLT. After the switching setup is performed (step S51), the switching control unit 14 determines whether or not LLT is greater than a predetermined time Td (step S52). When LLT is greater than the predetermined time Td, the switching control unit 14 determines whether or not the remaining time RT is less than the predetermined time Td (step S53).

When the remaining time RT becomes less than Td as the countdown proceeds, the switching control unit 14 transmits a dummy frame having an individual address to the peer wireless station (step S54). Then, the switching control unit 14 determines whether the transmission of the dummy frame is successful (step S55), and when the transmission is successful, the switching control unit 14 resets the timer (LLCT) 34 (step S56). Thus, the timer of both the wireless stations which communicate with each other is reset to a LLT setting value, thereby suppressing the frequency band switching which disregards communication in the 60 GHz band.

Thereafter, until the switching re-setup is performed, the switching control unit 14 performs transmission of a dummy frame when the remaining time RT is less than Td.

On the other hand, when the transmission of a dummy frame fails, the switching control unit 14 performs determination as to whether time of the LLT elapses (step S57), and if time of the LLT elapses, the switching control unit 14 performs the frequency band switching (step S58). Since the transmission of the dummy frame fails if the channel state deteriorates at the dummy frame transmission, the reset of the timer 34 is not reset, and thus the frequency band switching to the 2.4 GHz band is performed.

If LLT is the Td or less in step S52, the switching control unit 14 does not perform a transmission process of a dummy frame, and performs determination as to whether time of the LLT elapses (step S57); if time of the LLT elapses, the switching control unit 14 performs the frequency band switching (step S58).

Although the value of Td can be set to be an arbitrary value, if the value is set to be greater than or equal to a current LLT value, the dummy frame is transmitted at the time of switching setup and the timer 34 is reset, and thus the dummy frame is consecutively transmitted, inappropriately.

Therefore, the dummy frame transmission is performed in case that LLT is greater than the Td.

Since an overhead is increased if the dummy frame is frequently transmitted, it is preferable to set the Td to a value greater than the T2 or the T3 in FIGS. 4 and 5 and to use the dummy frame when the LLT is equal to or greater than the T1 or T2. Instead of the dummy frame transmission, the switching re-setup may be performed using the same LLT. Thus, the same function may be realized in that the timer is set to the value of LLT which is the initial value.

Although the operation of the timer 34 is omitted in FIGS. 8 and 9, the reset through the countdown by the timer 34 and the transmission of a frame is performed in the background. Further, the operation associated with an event is also simplified in FIG. 8 and is omitted in FIG. 9, but the operation corresponding to FIG. 5 is also performed.

As described above, in the second embodiment, when the remaining time RT up to a lapse of time of the LLT is less than a predetermined time Ts1, the wireless communication unit of the switching target frequency band resumes from the sleep state; when the remaining time RT is a predetermined time Ts2 or more, the wireless communication unit of the switching target frequency band transitions to a sleep state. Thus, most of the time in which the frequency band of the switching target is not used, a circuit of the wireless communication unit regarding the frequency band of the switching target is in a sleep state intended to save power, while realizing the frequency band switching at a high speed.

Further, in the second embodiment, when the remaining time RT is less than a predetermined time Td, a dummy frame with an individual address is transmitted to the peer station and a timer which counts down the LLT is reset. Thus, for example, in a state in which the channel state deterioration does not occur, it is possible to suppress the frequency band switching which disregards communication in the 60 GHz band. Further, the occurrences of the dummy frame transmission is lowered by dedicating the dummy frame transmission to the case that LLT is greater than the predetermined time Td, and thus the overhead of communication by the dummy frame can be reduced.

In the present embodiment, a case of performing the frequency band switching from the 60 GHz band to the 2.4 GHz band, that is, the frequency band switching in which a communication in the 60 GHz band precedes described, but the present embodiment is not limited thereto. The present embodiment can be applied even to a case of switching from the 2.4 GHz band to the 60 GHz band, a case of switching to other frequency bands, for example, a 5 GHz band, and a case of switching to a certain frequency band in a device corresponding to frequency bands of three or more.

According to the present embodiment described above, it is possible to perform a high speed switching to an appropriate frequency band, for example, in a wireless communication device corresponding to multiple bands. According to the present embodiment, it is possible to realize, for example, a new service for achieving a high speed together with stability by cooperation with ultra-high-speed short-range communication and low-speed long-distance communication, or an application for roaming between heterogeneous systems in mobile communication.

Various aspects of the embodiments according to the present disclosure include the followings:

A control method of switching frequency band according to a first disclosure is a method which switches a frequency band used in communication by a wireless station capable of communication in two or more frequency bands, sets a timeout value based on a change in a communication state, performs a switching setup sequence during communication in a first frequency band among the two or more frequency bands, and the switching setup sequence includes a step of transmitting the timeout value used in switching to communication in a second frequency band among the two or more frequency bands to a peer wireless station, using the first frequency band which is being used for communication, and performs switching to the second frequency band when time of the timeout value elapses from when the switching setup sequence is completed.

According to a second disclosure of the control method of switching frequency band, in the control method of switching frequency band according to the first disclosure, a change in communication states of a plurality of types is detected as the change in the communication state, and one timeout value is selected and set from a plurality of different timeout values according to the communication state.

According to a third disclosure of the control method of switching frequency band, in the control method of switching frequency band according to the first disclosure, the change in the communication state includes connection establishment with the peer wireless station, and the timeout value is set to a predetermined value T1 after the connection is established.

According to a fourth disclosure of the control method of switching frequency band, in the control method of switching frequency band according to the first disclosure, when the switching setup sequence is completed and another change in the communication state is detected before the time of the timeout value elapses, switching re-setup is performed after changing the timeout value to a value according to the another change in the communication state.

According to a fifth disclosure of the control method of switching frequency band, in the control method of switching frequency band according to the fourth disclosure, the switching re-setup is changing the timeout value to the value according to the another change in the communication state after tearing down setting of the switching setup sequence which has been completed before.

According to a sixth disclosure of the control method of switching frequency band, in the control method of switching frequency band according to the fourth disclosure, the switching re-setup includes a timeout value change sequence including transmission of a timeout value change request frame and reception of a timeout value change acknowledge frame which is transmitted in response to the timeout value change request frame.

According to a seventh disclosure of the control method of switching frequency band, in the control method of switching frequency band according to the third disclosure, the communication state includes a state regarding a presence or absence of stream transmission to the peer station, and the timeout value is set to a predetermined value T2 which is smaller than the T1, when the stream transmission occurs.

According to an eighth disclosure of the control method of switching frequency band, in the control method of switching frequency band according to the third disclosure, the communication state includes a state regarding a queue remaining amount of a transmission queue which accumulates transmission data, and the timeout value is set to a predetermined value T3 which is smaller than the T1, when the queue remaining amount is equal to or greater than a predetermined value.

According to a ninth disclosure of the control method of switching frequency band, in the control method of switching frequency band according to the third disclosure, the communication state includes a channel state with the peer wireless station, and the timeout value is set to a predetermined value T4 which is smaller than the T1, when the channel state deterioration is detected.

According to a tenth disclosure of the control method of switching frequency band, in the control method of switching frequency band according to the ninth disclosure, the communication state includes any one of a state of a transmission error or a strength of a received signal.

According to an eleventh disclosure of the control method of switching frequency band, in the control method of switching frequency band according to the first disclosure, the timeout value is set depending on the change in the communication state, using at least one of a presence or absence of stream transmission to the peer station, a queue remaining amount of a transmission queue which accumulates transmission data, and a channel state with a peer wireless station, as the communication state.

According to a twelfth disclosure of the control method of switching frequency band, in the control method of switching frequency band according to the eleventh disclosure, the change in the communication state includes connection establishment with the peer wireless station, and the timeout value is set to a predetermined value T1 which is greater than a value according to other changes in the communication state, after the connection is established.

According to a thirteenth disclosure of the control method of switching frequency band, in the control method of switching frequency band according to the first disclosure, a wireless communication unit of a switching target frequency band resumes from a sleep state, when remaining time up to a lapse of time of the timeout value is less than a first predetermined time.

According to a fourteenth disclosure of the control method of switching frequency band, in the control method of switching frequency band according to the first disclosure, a wireless communication unit of a switching target frequency band transitions to a sleep state, when remaining time up to a lapse of time of the timeout value is greater than a second predetermined time.

According to a fifteenth disclosure of the control method of switching frequency band, in the control method of switching frequency band according to the first disclosure, the wireless station includes a timer which counts the timeout value with a lapse of time, the timer is set to the timeout value, when the switching setup sequence is performed, and it is determined that time of the timeout value elapses when the value of the timer is counted down and reaches 0.

According to a sixteenth disclosure of the control method of switching frequency band, in the control method of switching frequency band according to the fifteenth disclosure, when the timeout value is greater than a third predetermined time and the remaining time up to a lapse of time of the timeout value is less than the third predetermined time, a dummy frame having an individual address corresponding to the peer station is transmitted and the timer is reset to the timeout value.

A wireless communication apparatus according to a seventeenth disclosure includes a wireless communication unit capable of communicating in two or more frequency bands; a timeout value setting unit that sets a timeout value used in switching a frequency band used in communication, based on a change in a communication state; and a switching control unit that performs a switching setup sequence including a step of transmitting the timeout value used in switching to the communication in a second frequency band among the two or more frequency bands, during communication in a first frequency band among the two or more frequency bands, to a peer wireless station, using the first frequency band which is being used for communication, and performs switching to the second frequency band when time of the timeout value elapses from when the switching setup sequence is completed.

Although the foregoing has described various embodiments with reference to the drawings, the present disclosure is not limited thereto. Various modifications or variations within the scope described in the claims are apparent to those having an ordinary skill in the art, and should be understood to belong to the technical scope of the present disclosure. Further, any combination of respective components in the embodiment is possible without departing from the scope of the disclosure.

Further, respective components of the wireless communication apparatus in the respective embodiment may be realized by a Large Scale Integration (LSI) which is an integrated circuit. The components of the respective units of the wireless communication apparatus may be separately formed into one chip, or may be formed into one chip including some or all components. Further, the components are not limited to the LSI, but may also be referred to as an Integrated Circuit (IC), a system LSI, a super LSI, or an ultra LSI, depending on the degree of integration.

Further, a method of circuit integration is not limited to the LSI, but may be realized by a dedicated circuit or a general-purpose processor. For example, a Field Programmable Gate Array (FPGA) or a reconfigurable processor capable of reconfiguring settings and connection of circuit cells within an LSI may be used. In addition, if an integrated circuit technology that replaces an LSI emerges due to advancement of a semiconductor technology or other derivative technologies, functional blocks may of course be integrated using the technology. Application of biotechnology and the like may also be possible.

Further, the present disclosure can realize the respective operations of the wireless communication apparatus in the respective embodiments by a control method of switching frequency band which performs the respective operations.

Further, the respective embodiments may be realized by combining any of a wireless communication apparatus, a control method of switching frequency band, a transmission apparatus, a transmission method, a transmission circuit, a reception apparatus, a reception method, a reception circuit, or a program together, which performs a part of the frequency band switching process which realizes the respective embodiments. For example, a part of a configuration of the wireless communication apparatus which is described in the respective embodiment is realized by the wireless communication apparatus or an integrated circuit (wireless communication circuit), procedures of other operations are defined in a program, for example, a CPU may read and execute a program stored in a memory.

This application is on the basis of Japanese patent application filed on Dec. 27, 2012 (Application No. 2012-285861), the contents of which are incorporated herein by reference.

INDUSTRIAL APPLICABILITY

The present disclosure has an effect that switching of a frequency band to be used can be realized at a high speed, for example, it is useful as a control method of switching frequency band for switching a frequency band which is used and a wireless communication apparatus by using the method in a wireless communication device or the like corresponding to a multi-band device.

REFERENCE SIGNS LIST 11 60 GHZ BAND-WIRELESS COMMUNICATION UNIT
12 2.4 GHZ BAND-WIRELESS COMMUNICATION UNIT
13 COMMUNICATION STATE MANAGEMENT UNIT
14 SWITCHING CONTROL UNIT
15 TRANSMISSION DATA MANAGEMENT UNIT
16 SLEEP CONTROL UNIT
21 TRANSMISSION DATA STATE DETECTION UNIT
22 CHANNEL STATE DETECTION UNIT
23 EVENT GENERATION UNIT
31 STATE MANAGEMENT UNIT
32 LLT SETTING UNIT
33 PATH CONTROL UNIT
34 LINK LOSS COUNTDOWN TIMER (LLCT)

The invention claimed is:

1. A wireless communication apparatus comprising:
wireless communication circuitry, which in operation, communicates in two or more frequency bands;
timeout value setting circuitry, which in operation, sets a timeout value used in switching a frequency band used in communication, based on at least one change in a communication state;
switching control circuitry, which in operation, performs:
  (i) a switching setup sequence during communication in a first frequency band among the two or more frequency bands, wherein the switching setup sequence includes transmitting the timeout value used in switching to communication in a second frequency band among the two or more frequency bands to a peer wireless station, using the first frequency band which is being used for communication,
  (ii) switching to the second frequency band after the timeout value elapsed from an end of the switching setup sequence,
wherein, when the timeout value is greater than a first predetermined time and a remaining time until the timeout value elapses is less than the first predetermined time, a dummy frame having an individual address to the peer station is transmitted, a countdown indicating the elapse of the timeout value is reset and the countdown is restarted after the transmission of the dummy frame succeeds.

2. A wireless communication apparatus comprising:
wireless communication circuitry, which in operation, communicates in any one of two or more frequency bands;
timeout value setting circuitry, which in operation, sets a timeout value used in switching a frequency band used in communication, based on at least one change in a communication state; and
switching control circuitry, which in operation, performs:
  (i) a switching setup sequence during a first communication in a first frequency band among the two or more frequency bands, the switching setup sequence including transmitting the timeout value used in switching to a second communication in a second frequency band among the two or more frequency bands to a peer wireless station, using the first frequency band which is being used for the first communication,
  (ii) switching to the second frequency band after the timeout value elapsed from an end of the switching setup sequence,
wherein a sleep state of the second frequency band is controlled based on a remaining time until the timeout value elapses.

3. The wireless communication apparatus according to claim 2,
wherein the second frequency band resumes from the sleep state, when the remaining time until the timeout value elapses is less than a second predetermined time.

4. The wireless communication apparatus according to claim 2,
wherein the second frequency band transitions to the sleep state, when the remaining time until the timeout value elapses is greater than a third predetermined time.

* * * * *